March 5, 1940.  P. GOEBELS  2,192,287
APPARATUS FOR FEEDING FINELY DIVIDED MATERIAL
Filed March 24, 1937  2 Sheets-Sheet 2

Inventor
Paul Goebels
By Watson, Cott, Morces
Grindle
Att'ys

Patented Mar. 5, 1940

2,192,287

UNITED STATES PATENT OFFICE 2,192,287

APPARATUS FOR FEEDING FINELY DIVIDED MATERIAL

Paul Goebels, Dessau, Germany

Application March 24, 1937, Serial No. 132,857
In Germany September 6, 1935

2 Claims. (Cl. 302—45)

This invention relates to the feeding or mixing of finely divided materials, for example coal dust, cement raw material, cement, lime, fertilizers, and various chemicals in pulverulent and granular form. It is the principal object of the invention to provide greater uniformity in the discharge of such materials from a storage container or other receptacle and in the delivery of such materials to apparatus for storing or treating the same.

Considerable difficulty has been encountered heretofore in withdrawing powdered or granular materials from silos or the like in which the discharge is usually effected primarily by gravity. Thus if an outlet is formed at the bottom of the receptacle, it is found that the material tends to form a vault about the outlet which either retards the material or prevents discharge altogether, and the condition is relieved only by agitation of the material. Under other conditions the angle of repose of the material may cause a considerable quantity of the material to collect adjacent the outlet and partially obstruct the flow.

It is also exceedingly difficult, where discharge or delivery of a uniform quantity by weight of a material is important, to maintain such uniformity under varying storage conditions. For example, if material is being fed from a storage receptacle, the weight of the material results in lack of uniform density, the strata in the lower portion of the container having considerably greater weight per unit volume than the strata in the upper portion thereof, with the result that a considerably greater quantity of the stored material is discharged with the release of a given volume when the container is full than when it is nearly empty. This is particularly true of materials which have been standing for some time, since there is a tendency to pack at the lower end of the container, which not only increases the difficulty of discharging the same but results in decided irregularity in the weight of delivered material.

Efforts have been made to overcome these difficulties by the use of mechanical stirring devices and by the employment of star feeders or discharge screw conveyors, but although such devices tend to establish uniformity of feed so far as volume is concerned, differences in density of the material at different strata obviously result in the discharge of different weights of material per unit volume. Again, the employment of mechanical feeding devices is frequently accompanied by the phenomenon known as flooding, the material suddenly acquiring momentum and tending to overrun the feeding devices.

I have discovered that all of these objections can be removed and absolute uniformity in the feeding of finely divided materials can be secured with a simple and inexpensive apparatus if the stored material is first suffused with air or other gaseous medium. By introducing the air in a finely divided condition and in a sufficient quantity, the material can, in effect, be caused to float and to assume a more or less fluid condition. While in this condition it can be shown that the density of different strata of the material approaches uniformity, the weight per unit volume at different strata being substantially the same. Thus by the provision of means for maintaining the material in this substantially fluid condition while it is being conveyed from the storage receptacle or introduced to apparatus for processing or consumption, a uniform quantity by weight of the material can be readily transported. The adverse effects of the storage of material for a considerable period of time, resulting in packing of the lower strata of the material, are also obviated by this process.

While the suffusion of the material within the receptacle may be accomplished by means disposed within the receptacle itself, in the preferred form of my invention, illustrated herein, the gaseous medium is introduced into the material, at least in part, by means disposed within a discharge housing which may be positioned beneath the outlet of the receptacle. The means in question preferably comprises a plate or wall of porous material through which the gaseous medium is forced under pressure. The establishment of the desired condition of fluidity and uniform density in the material cannot be secured by blowing air into the material through spaced openings or nozzles since an extremely fine division of the air particles is required for proper suffusion.

It is a more specific object of the invention to inject into a receptacle or into a discharge housing associated with the receptacle a gaseous medium under pressure through a wall of gas pervious or porous material so that the gaseous medium will pass into the material in a state of infinitesimally small division, and to associate with the receptacle or with the discharge housing a discharge conduit, a jet or directional current of gaseous medium being projected into the housing and toward the conduit, or within the conduit itself, so as to cause the material to flow along the conduit while the same is in a condition of fluidity or suspension.

It is a further object of the invention to effect mixing of different materials, or of material of the same nature which have been stored in different receptacles, by first establishing the described condition of suspension or fluidity of the material in the receptacles and thereafter causing the materials to unite in a common chamber or flow conduit.

Further objects and features of the invention will be apparent from the following description taken in connection with the accompanying drawings, in which.

Figure 1:
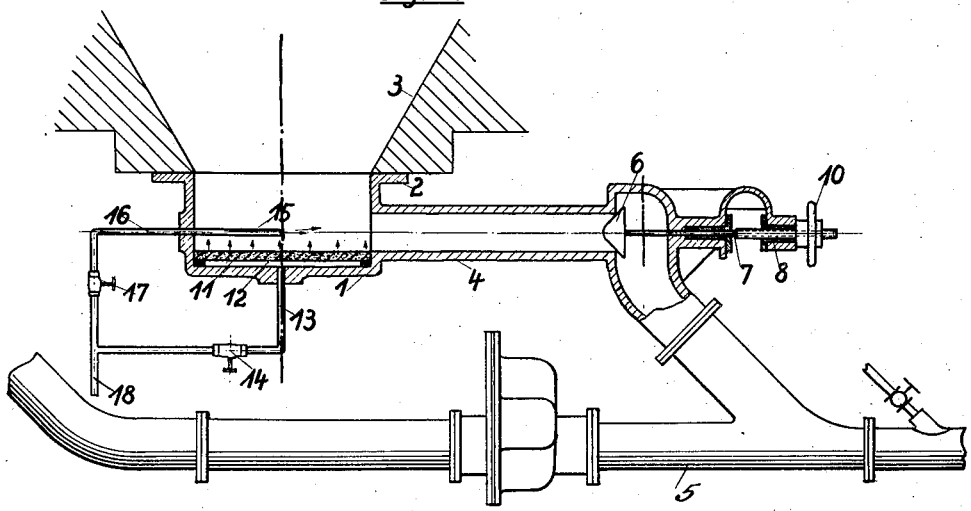
Figure 1 is a vertical sectional view illustrating one form of apparatus for carrying out the invention.

For convenience in describing the invention, reference is made to the several forms thereof illustrated in the drawings and specific language is used. It will nevertheless be understood that no limitation of the invention is thereby intended and it will be appreciated that various further modifications of the apparatus illustrated herein, by means of which the principles of the invention may be followed, would readily occur to one skilled in the art to which the invention relates.

Referring more specifically to the drawings, it will be observed that Figure 1 illustrates an arrangement which may readily be employed as an adjunct to one or more silos or storage receptacles without modification of the latter. Thus in this figure a lower portion of a storage receptacle defining a discharge outlet is indicated at 3, a housing 1 communicating with the outlet and being secured to the mouth thereof by means of an annular flange 2. A discharge conduit 4 extends laterally of and communicates with the housing 1, the conduit 4 being connected with a main flow conduit 5 through which the material is conducted and delivered to suitable apparatus for use, treatment, or further storage. A valve 6 may serve to accurately control the flow of material in the discharge conduit 4, this valve having a stem 7 threaded into a bushing 8 and being rotatable by a hand wheel 10. Discharge of the stored material from the receptacle 3 into the housing 1 may be interrupted by the provision of any conventional and suitable means.

Suitably positioned within the housing 1, preferably at the bottom thereof, is a plate or wall 11 of gas pervious material, for example, of filter stone, porous brick, porous caoutchouc, or any other material having a multiplicity of fine perforations or openings therein. A passage 12 extends beneath the wall 11 and communicates through a duct 13 with a supply pipe 18 for gaseous medium under pressure, a valve 14 being provided in the duct 13 for regulation of the flow of gas through the plate 11.

A duct 16, controlled by a valve 17, also communicates with the supply pipe 18, the duct 16 extending in to the housing 1 above the wall 11 and being provided with a nozzle 15 whereby a jet of air or other gas may be delivered within the housing and toward and in the direction of the length of the discharge conduit 4.

When gas under pressure is admitted to the passage 12 it is injected into the housing 1 in a state of extremely fine division and suffuses the material within the receptacle above the housing. Not only is the material very noticeably expanded as the result of the injection of air in this manner, but it attains a mobile, fluid or suspended state, the different strata of material acquiring remarkable uniformity of density. In this condition the material flows smoothly under the action of gravity into the housing 1 and is caused to move rapidly and uniformly lengthwise of the discharge conduit 4 into the main conduit 5 by the propelling effect of the jet of gas issuing from the nozzle 15. Owing to the uniform density and the fluid condition of the material, accurate regulation of flow can be secured by manipulation of the valve 16.

Figure 2:
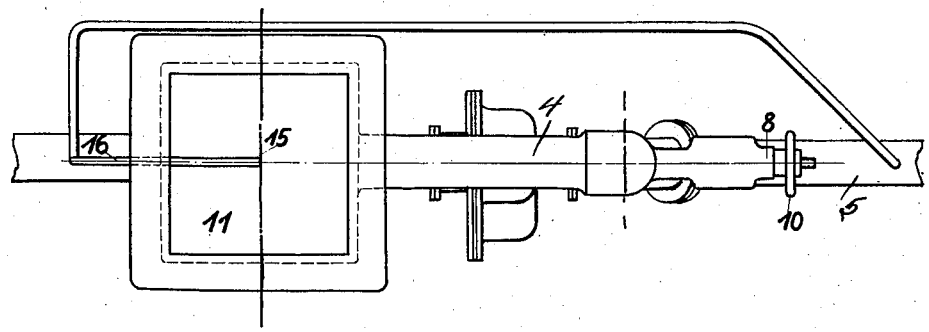
Figure 2 is a bottom plan view of the structure shown in Figure 1.
Figure 3:
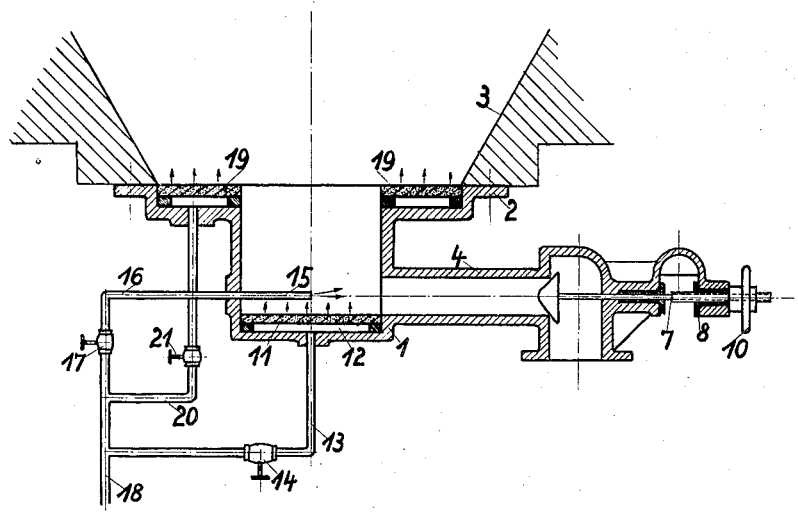
Figures 3 and 4 are vertical sectional views similar to that shown in Figure 1 but illustrating modified forms of the apparatus.

Referring now to Figure 3 of the drawings, it will be observed that the arrangement illustrated is quite similar to that shown in Figures 1 and 2 so far as the housing 1 and associated apparatus is concerned, and similar reference characters are employed to designate elements of similar construction and function. It will be observed, however, that the arrangement is such that gaseous medium under pressure is injected into the material within the storage container 3 at the upper end of the discharge housing 1 as well as in the lower portion thereof. Thus the upper end of the housing may be formed to support an annular plate or wall 19 of porous material, air or other gas under pressure being introduced into a passage beneath this wall through a duct 20 which is controlled by a valve 21, the duct 20 communicating with the supply pipe 18.

Figure 4:
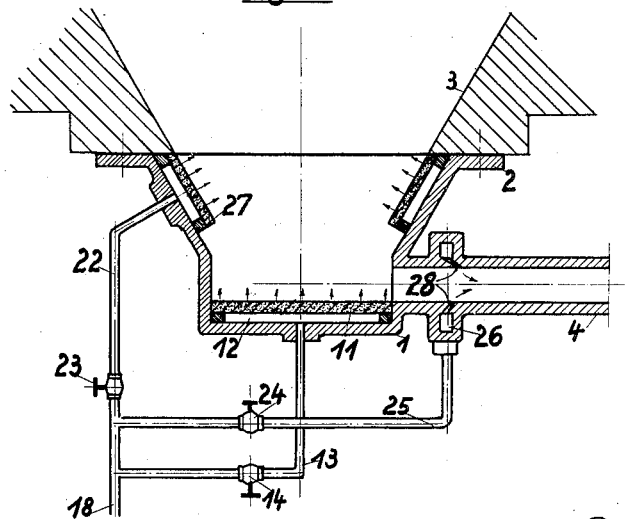

In Figure 4 the upper portion of the housing 1 is provided with an annular porous wall 27 to which gas under pressure is supplied through the duct 22, controlled by the valve 23. The wall 27 is preferably positioned and arranged to afford a continuation of the walls of the receptacle 3 defining the discharge outlet therefrom. It will be observed that in either of these forms of the invention no modification of the receptacle 3 is required, although, as heretofore pointed out, gas pervious walls or linings through which gas under pressure is injected into the material may be associated directly with the receptacle 3 if desired.

In Figure 4 the means for inducing movement of the material along the conduit 4 is modified, the arrangement illustrated therein including an annular passage 26 which surrounds the discharge conduit 4 and which communicates with the interior thereof through a plurality of passages 28, the latter being directed generally tangentially of the conduit 4, or being otherwise disposed in such manner that gas flows into the conduit 4 in a direction having a component lengthwise of the conduit. It will of course be understood that the passages 28 may be separately formed at spaced intervals about the circumference of the conduit 4 or may constitute a single passage permitting introduction of the gaseous medium at all points about the periphery of the conduit. The passage 26 communicates with the supply pipe 18 through a duct 25 which is controlled by a valve 24.

The flow of material from the discharge conduits 4 in the apparatus shown in Figures 3 and 4 is of course preferably controlled by a valve and such apparatus may be used to establish flow from a plurality of outlets in a single storage receptacle or from a plurality of receptacles, as has been indicated in connection with the arrangement shown in Figure 1 of the drawings. In all of these forms of the invention the material is uniformly withdrawn from the receptacle and is uniformly delivered, at even density, to further processing devices or storage receptacles.

Having thus described the invention, what is claimed as new and desired to be secured by Letters Patent is:

1. In apparatus for feeding finely divided material, the combination with a receptacle for the material provided with a discharge outlet, of means associated with the receptacle for suffusing the material therein with a gaseous medium, a discharge housing beneath and in communication with said outlet, said housing being of small capacity as compared with said receptacle and having a bottom wall of gas pervious material, means for diffusing gaseous medium under pressure through said wall, a discharge conduit of reduced size communicating with said housing above said bottom wall, and separate means associated with said housing for causing a flow of gaseous medium and gas suffused material in the direction of the length of said conduit.

2. A discharge unit for attachment to a gravity discharge storage container for pulverulent or granular material, said unit comprising a discharge housing of relatively small capacity adapted to be secured to said container in communication with an outlet therein, said housing being formed to provide a wall of porous material at the bottom thereof and a further wall of porous material at the upper end thereof and adjacent the container outlet, means for delivering a gas under pressure through said last named wall to suffuse the material in said container with the gas, means for delivering gas under pressure through said first named wall to suffuse the material in said housing with gas, whereby the density of the material in said housing may be maintained constant, a discharge conduit communicating with said housing, and means for causing a flow of gas in said conduit and away from said housing.

PAUL GOEBELS.